United States Patent [19]
Ahrens

[11] 3,894,269
[45] July 8, 1975

[54] HIGH VOLTAGE PROTECTION CIRCUIT

[75] Inventor: Paul Raymond Ahrens, Indianapolis, Ind.

[73] Assignee: RCA Corporation, New York, N.Y.

[22] Filed: Jan. 31, 1974

[21] Appl. No.: 438,325

[52] U.S. Cl. .................................................. 315/379
[51] Int. Cl. .............................................. H01j 29/70
[58] Field of Search ... 315/27 TD, 27 R, 20, 28–29, 315/26, 369, 379, 380

[56] References Cited

UNITED STATES PATENTS

| | | | |
|---|---|---|---|
| 3,502,941 | 3/1970 | Buechel | 315/27 TD |
| 3,629,644 | 12/1971 | Waybright | 315/29 |
| 3,767,963 | 10/1973 | McArdle | 315/20 |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

An integrated thyristor-rectifier (ITR) replaces the conventional damper diode in a television deflection system. The damper diode function is performed by the rectifier portion of the ITR, the thyristor being reverse biased during the damping interval. The forward breakover voltage characteristic of the thyristor portion of the ITR insures that the cathode of the damper-rectifier portion of the ITR will not rise to a higher voltage than the thyristor's forward breakover voltage above the cathode of the thyristor during the remaining portion of the deflection cycle. If the cathode of the damper-rectifier rises above the thyristor forward breakover voltage, the thyristor begins to conduct heavily causing the deflection current to decay rapidly and rendering the television display unviewable while simultaneously limiting the generated high voltage.

6 Claims, 4 Drawing Figures

HIGH VOLTAGE PROTECTION CIRCUIT

BACKGROUND OF THE INVENTION

This invention relates to high voltage protection systems for preventing the development of excessive voltage coupled to a display picture tube.

Most modern television receivers develop high voltages necessary for the focus and anode voltages of the picture tube from a winding of the horizontal output transformer. Some high voltage generating systems have the propensity to develop excessively high voltages under certain conditions such as failure of high voltage regulating components or high line voltage.

Excessively high generated voltages may under certain circumstances lead to component failures and in some instances to the emission from the receiver of potentially harmful X-radiation. In recognition of this fact, manufacturers generally include in their receivers means for disabling the receivers when the generated high voltages produced therein exceed certain design limitations. Such protection systems generally act to render the kinescope display unviewable when the generated high voltage becomes high enough to make X-ray emissions or component damage a likelihood.

A significant problem inherent in many such systems, however, is that they may be removed from the receiver or bypassed in the receiver without affecting normal receiver operation. Thus when excessive high voltages are generated, such systems either fail to function by virtue of the fact that they have been removed from circuit, or function but fail to affect receiver operation under abnormal high voltage conditions because they have been bypassed. Similarly, many such systems may experience component failure themselves and cease to function effectively to provide a warning when excessively high voltages are being generated by the receiver.

Ideally, a system is desired which would not affect receiver operation under normal conditions but which would provide the necessary warning by disrupting the viewable display when excessive voltages are being generated. Additionally, such a system should provide a similar warning when it has been bypassed and the receiver would not produce a viewable display if it were removed from the receiver. It should also be designed so that if it malfunctioned, the receiver would be incapable of producing a viewable display.

SUMMARY OF THE INVENTION

In accordance with the present invention a high voltage protection circuit is provided for reducing a high voltage supplied to a kinescope and rendering the kinescope display unviewable when the high voltage exceeds a predetermined level. The high voltage protection circuit comprises a deflection winding, a high voltage generator for generating signals in response to current flow therein and for rectifying the signals for producing high voltage, and deflection current generating means coupled to the deflection winding and to the high voltage generator for generating deflection current in the deflection winding and current flow in the high voltage generator. The deflection current generating means includes bidirectionally conductive switching means having a first state for conducting in a first direction for supplying scanning current to the deflection winding and for substantially impairing current flow in the opposite direction and a second state for conducting in the opposite direction when the voltage across the switching means tending to promote current flow in the opposite direction exceeds a predetermined switching voltage for altering the current flow and reducing the generated signals thereby limiting the high voltage.

A more complete description of the invention is given in the accompanying specification in conjunction with the accompanying drawings of which:

FIG. 1 is a partly blocked and partly schematic circuit diagram of a high voltage protection circuit embodying the invention; and FIGS. 2–4 illustrate waveforms obtained at various points in the circuit of FIG. 1.

DESCRIPTION OF THE PREFERRED EMBODIMENT

Figure 1:
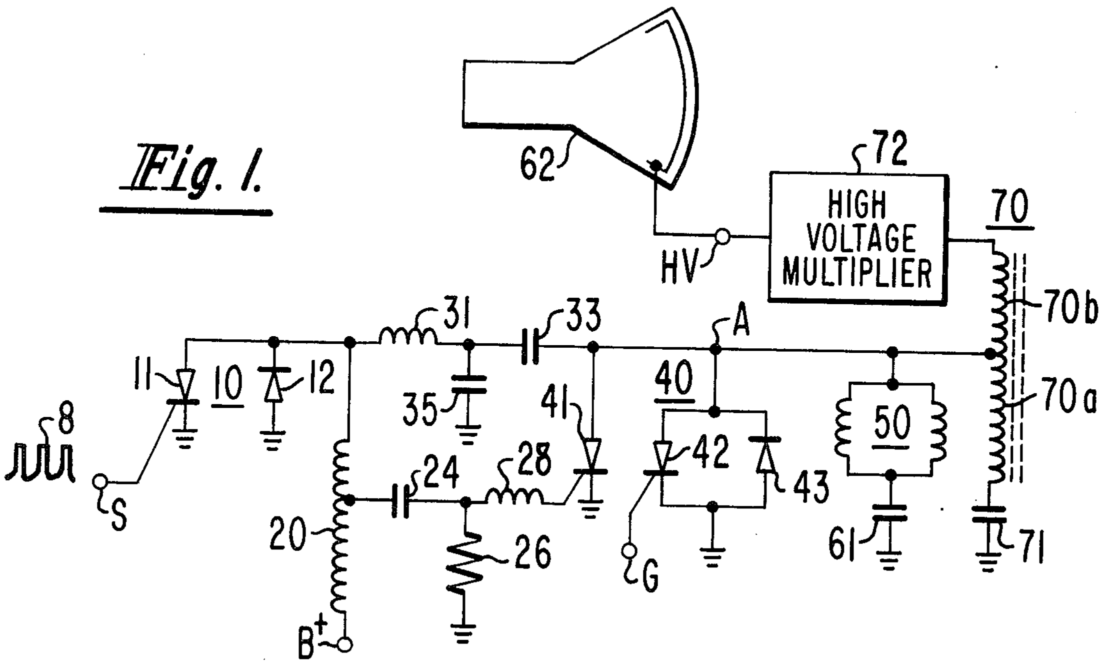

In the circuit illustrated in FIG. 1 which in most respects is similar to the SCR type horizontal deflection circuit suitable for use in television receivers as disclosed in U.S. Pat. No. 3,452,244, a signal 8 is coupled from a horizontal oscillator, not shown, to terminal S, the gate electrode of an SCR 11. The cathode of SCR 11 is coupled to ground. Its cathode is coupled to the anode of a diode 12, the anode of which is coupled to ground. The combination of SCR 11 and diode 12 comprises a bidirectional conducting commutating switch 10.

The anode of SCR 11 is coupled to a terminal of an input reactor 20, another terminal of which is coupled to a direct current voltage supply B+. The anode of SCR 11 is also coupled to one terminal of a commutating inductor 31. The other terminal of inductor 31 is coupled to a terminal of an auxiliary capacitor 35, the other terminal of which is grounded, and to a terminal of a commutating capacitor 33. The other terminal of capacitor 33 is coupled to the anode of an SCR 41, the cathode of which is grounded.

The gate electrode of SCR 41 is coupled through an inductor 28 to the junction of a capacitor 24 and a resistor 26. The remaining terminal of resistor 26 is coupled to ground and the remaining terminal of capacitor 24 is coupled to a tap on input reactor 20. Elements 24, 26 and 28 comprise a waveshaping circuit for a signal coupled from winding 20 to the gate electrode of SCR 41 to trigger it into conduction. The anode of SCR 41 is coupled to a terminal A, one terminal of a two-terminal device known as an integrated-thyristor rectifier (ITR) 40. The other terminal of ITR 40 is coupled to ground. An ITR is a two-terminal device comprising a rectifying diode and an SCR coupled so that the anode of each is coupled to the cathode of the other to form a terminal of the ITR.

ITR 40 comprises a rectifier diode 43, the anode of which is coupled to ground and the cathode of which is coupled to terminal A, and an SCR 42, the anode of which is coupled to terminal A and the cathode of which is coupled to ground. A gate electrode, terminal G of SCR 42, is not coupled in circuit and in practice no external lead is supplied to it in the fabrication of ITR 40 for use in the circuit of this invention. SCR 41 and ITR 40 comprise a bidirectional conducting trace switch. The use of an ITR as part of the trace switch is not disclosed in the aforementioned U.S. Pat. No. 3,452,244 and its function as a feature of the invention will be described subsequently.

One terminal of a pair of deflection windings 50 is coupled to terminal A. The other terminal of deflection winding pair 50 is coupled to a terminal of an S-shaping capacitor 61, the other terminal of which is coupled to ground. Terminal A is coupled to a primary winding 70*a* of a horizontal output transformer 70. The other terminal of winding 70*a* is coupled to a terminal of a blocking capacitor 71. The remaining terminal of capacitor 71 is coupled to ground. Terminal A is also coupled to a terminal of a high voltage winding 70*b* of horizontal output transformer 70. The other terminal of winding 70*b* is coupled to a terminal of a high voltage multiplier 72 wherein the voltage generated across winding 70*b* in response to the action of the trace switch comprising SCR 41 and ITR 40 is multiplied. The high voltage thereby generated appears at terminal HV of high voltage multiplier 72 and is coupled to the anode electrode of a kinescope 62.

The operation of the deflection circuit of FIG. 1 with the exception of ITR 40 is described in detail in the aforementioned U.S. Pat. No. 3,452,244 issued to W. F. W. Dietz and entitled "Electron Beam Deflection and High Voltage Generation Circuit," but a brief description of its operation is set forth here to aid in understanding the present invention.

In the circuit of FIG. 1 at the beginning of the trace interval rectifier 43 of ITR 40 is forward biased by virtue of the voltage established across deflection windings 50. Rectifier 43 conducts a linearly decreasing current which flows through horizontal deflection windings 50 to charge capacitor 61 as energy is recovered from a collapsing magnetic field in windings 50. At some point shortly before the current in deflection winding pair 50 reaches zero, SCR 41 has been placed in condition for conduction by a positive-going gating pulse supplied from input reactor 20 through the waveshaping circuitry comprising elements 24, 26 and 28.

Capacitor 61 is a relatively large capacitor and therefore provides a substantially constant voltage across deflection windings 50 when trace SCR 41 is closed. As SCR 41 becomes conductive, capacitor 61 begins to discharge through deflection windings 50 causing a reversal of current through widings 50 at the midpoint of the trace interval.

Rectifier 43 of ITR 40 has become reverse biased by virtue of the low voltage across winding pair 50 midway through the trace interval and SCR 41, which has been placed in a conductive state by virtue of the abovementioned gating pulse, now begins to conduct current in a linearly increasing manner through deflection windings 50 in the opposite direction to discharge capacitor 61. The conduction of SCR 41 thereby establishes the second half of the trace interval.

A short time, approximately 8 microseconds, before the end of the second half of the trace interval, a positive-going gating pulse of signal 8 is supplied by the horizontal oscillator, not shown, to the gate electrode of SCR 11 which enables it for conduction. Capacitors 33 and 35, which have become positively charged by conduction through input reactor 20, now begin to discharge through commutating SCR 11. The discharge current of capacitors 33 and 35 which flows in the reverse direction through SCR 41 causes an increasing current to flow in the reverse direction through SCR 41. Therefore, trace SCR 41 quickly becomes reverse biased as discharge current for capacitors 33 and 35 through SCR 11 becomes greater than the trace interval current flowing in the forward direction through SCR 41. The reverse biasing of trace SCR 41 inititates the retrace interval.

During the retrace interval current first flows through retrace SCR 11 and the now forward biased trace rectifier 43 of ITR 40 as commutating capacitor 33 and auxiliary capacitor 35 continue to discharge. Also during this interval, the discharging of capacitors 33 and 35 supplies energy to commutating inductor 31. The magnetic field thereby established in inductor 31 causes forward current to continue to flow in commutating SCR 11 after capacitors 33 and 35 have completely discharged, causing a charge to build up across capacitors 33 and 35 in the opposite direction. Commutating SCR 11 and trace diode 43 of ITR 40 both become reverse biased by the charge thus established across capacitors 33 and 35.

At this time, as the current in the commutating capacitor 33 begins to reverse, energy is supplied to primary winding 70*a* of horizontal output transformer 70. As capacitor 33 supplies energy to primary winding 70*a*, S-shaping capacitor 61 and deflection windings 50 also begin to transfer energy to winding 70*a* as they oscillate for one-half cycle with the inductance of winding 70*a* and the capacitance of blocking capacitor 71. This transfer of energy from commutating capacitor 33, S-shaping capacitor 61, and deflection windings 50 supplies the energy to winding 70*a* to generate the flyback pulse.

Capacitors 33 and 35 now begin to discharge through deflection winding pair 50 and capacitor 61 in the opposite direction by virtue of the voltage established at the junction of capacitors 33 and 35 which is negative with respect to ground. It is at this time that energy is added to capacitor 61 to compensate for dissipation losses occurring during the deflection cycle. Commutating SCR 11 and trace diode 43 of ITR 40 are reverse biased by this voltage and commutating diode 12 becomes forward biased to conduct retrace current during the second half of the retrace interval. At the end of the retrace interval, the junction of the ITR 40 and deflection winding pair 50 goes negative with respect to ground by virtue of the energy stored in deflection winding pair 50 by current flowing through it in the second half of the retrace interval and the magnetic field in deflection winding 50 begins to collapse again causing trace diode 43 of ITR 40 to conduct, thereby initiating the next succeeding trace interval.

During normal operation of the deflection circuit, the voltage at terminal A is controlled by the conduction of bidirectional commutating switch 10 and the bidirectional trace switch comprising trace SCR 41 and trace rectifier 43 of ITR 40. This voltage at terminal A is stepped up in the high voltage winding 70*b* of horizontal output transformer 70 and is further multiplied by voltage multiplier 72 to generate a high voltage at terminal HV necessary for the proper operation of kinescope 62.

However, when the voltage at terminal A rises to an abnormally high value due, for example, to high line voltage or malfunction of some receiver component, the high voltage generated at terminal HV also rises since it is a function of the voltage at terminal A and the possibility of undesirable X-ray emissions from kinescope 62 or further component malfunctions increases. At such time SCR 42 of ITR 40 acts to prevent further increases in the high voltage at terminal A by conducting and thereby substantially decreasing the voltage at terminal A and by disrupting the deflection current through deflection windings 50. This renders the kinescope display unviewable and provides an indication to the viewer of malfunction in the deflection and high voltage generation circuitry.

Figure 2:
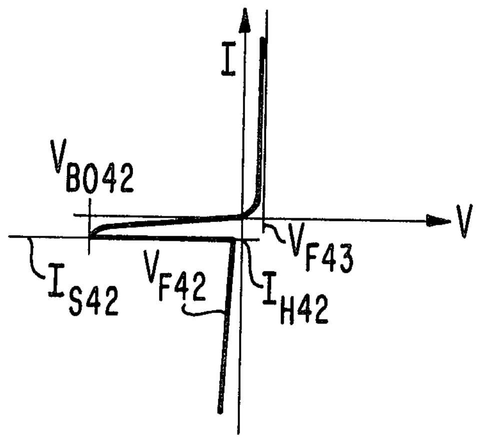

The current-voltage characteristic of the ITR comprising rectifier 43 and SCR 42 is shown in FIG. 2. The switching characteristics of the ITR are described in considerable detail by R. W. Aldrich and N. Holonyak, Jr., in an article entitled "Two-terminal Asymmetrical and Symmetrical Silicon Negative Resistance Switches," Journal of Applied Physics, Vol. 30, No. 11, Nov. 1959, pp. 1819–1824 and references cited there, but are briefly set forth here to aid in understanding the present invention. The positive current and voltage curve is the forward biased characteristic of rectifier 43 which acts as the trace switch rectifier of the deflection circuit as previously described. This forward characteristic is that of a fast recovery type diode suitable for operation at the horizontal deflection rate. The reverse characteristic is similar to that of a typical SCR under approximately zero gate current conditions.

SCR 42 remains in the nonconductive state with a relatively low forward current, less than ten microamperes, through it until the voltage across it reaches $V_{BO42}$. It is at this current and voltage, called the saturation current $I_{S42}$, and breakover voltage, $V_{BO42}$, that SCR 42 switches to the "on" state, becoming readily conductive and exhibiting a forward voltage drop $V_{F42}$ of approximately 1 volt. SCR 42 remains in the on state until the current through it decreases below the holding current $I_{H42}$ at which time SCR 42 switches to the "off" state again.

Thus, it may be seen that the ITR comprising rectifier 43 and SCR 42 serves to decrease the voltage at terminal A to a low level when the voltage across SCR 42 exceeds $V_{BO42}$, the breakover voltage of SCR 42. This rapid decrease in the voltage at terminal A impairs the deflection current flowing in deflection windings 50 rendering the kinescope display unviewable. Additionally, the low impedance path to ground through SCR 42 presented to the flyback voltage pulse appearing at terminal A results in a decrease in the amplitude of the voltage pulse appearing across high voltage winding 70*b*, thereby limiting the high voltage at terminal HV.

Figures 3, 4:
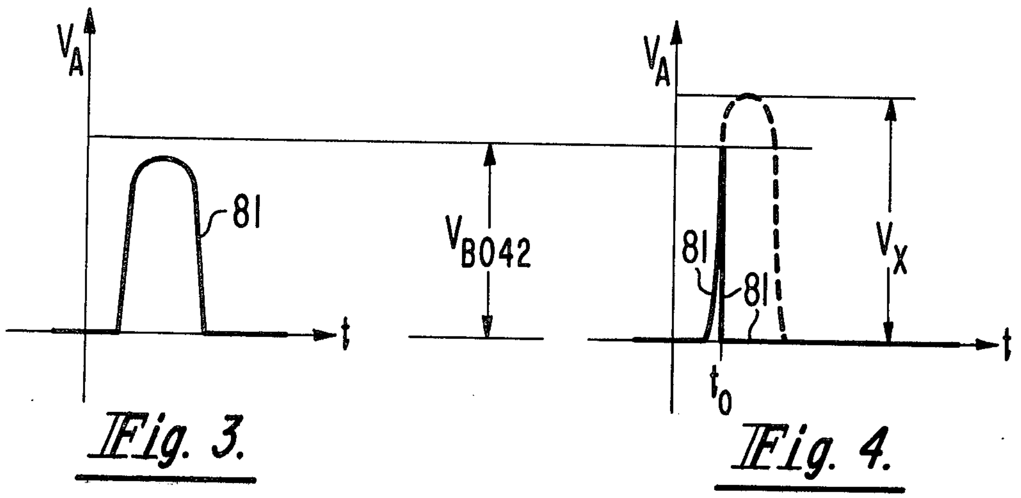

The function of the embodiment illustrated in FIG. 1 may be further explained in connection with the waveforms of FIGS. 3 and 4. As FIG. 3 indicates, during normal operation of the horizontal deflection generator and amplifier, the voltage $V_A$, waveform 81 at terminal A with respect to ground, will not exceed $V_{BO42}$, the breakover voltage of SCR 42 of ITR 40. Since the voltage across winding 70*b* is directly proportional to the voltage generated across winding 70*a*, SCR 42 of ITR 40 serves to provide an indication of when the generated high voltage across winding 70 exceeds normal operating limits.

The voltage at which SCR 42 will breakover into high forward conduction, i.e. turn on, is a controllable parameter in the construction of ITR 40. As FIG. 4 indicates, ITR 40 is constructed so that the predetermined $V_{BO42}$ is such that when excessively high voltage $V_X$ tends to be developed across winding 70*b*, the voltage $V_A$, waveform 81 shown in FIG. 4, will reach $V_{BO42}$ and SCR 42 of ITR 40 will be placed in the highly conductive state as indicated at time $t_0$ of FIG. 4. As a result, the voltage at terminal A will be reduced to some low level disrupting the supply of deflection current to deflection windings 50. The kinescope display will thereby be rendered unviewable giving an indication to the viewer of a high voltage generator malfunction in the receiver requiring attention. Additionally, the rapid decrease in the voltage at terminal A will limit the high voltage generated across winding 70*b* to a voltage up to the voltage normally generated by a voltage pulse of the breakover voltage at terminal A. This value may be lower depending upon the video signal which controls the beam current.

It should further be noted that since ITR 40 is a two-terminal device, it is impossible to remove the protection SCR 42 from active circuit connection by removing it from the receiver or by short circuiting it. In either situation, the ability of the receiver to produce a viewable display will be adversely affected since the deflection system will not be able to produce a viewable display unless rectifier 43 of ITR 40 is in circuit to perform the trace diode function.

Similarly, a malfunction of ITR 40 itself will render the raster unviewable. Since devices 42 and 43 have common junction areas, SCR 42 cannot become short circuited or open circuited unless rectifier 43 does likewise. Thus it may be seen that a shorted SCR 42 will result in the clamping of terminal A at ground voltage.

Since the voltage at terminal A will be clamped at ground voltage, during conduction of SCR 42 deflection current will not flow in deflection windings 50 and as a result the display will be rendered unviewable. Similarly, if SCR 42 of ITR 40 suffers an open circuit malfunction, rectifier 43 will also be open circuited and the deflection current will be disrupted thereby rendering the display unviewable.

What the invention provides is an actual "failsafe" high voltage protection circuit because in its normal operation excessive high voltage will be prevented and in the situation of any malfunction in the circuit, normal deflection circuit operation, and consequent kinescope high voltage generation, is interrupted.

What is claimed is:

1. A high voltage protection circuit for reducing a high voltage supplied to a kinescope and rendering the kinescope display unviewable when the high voltage exceeds a predetermined level, comprising:

a deflection winding;

a high voltage generator for generating signals in response to current flow therein and for rectifying said signals for producing said high voltage;

deflection current generating means coupled to said deflection winding and to said high voltage generator for generating deflection current in said deflection winding and said current flow in said high voltage generator, said deflection current generating means, including bidirectionally conductive switching means conducting in a first direction for supplying scanning current to said deflection winding and conducting in an opposite direction when the voltage across said switching means tending to promote said current flow in said opposite direction exceeds a predetermined switching voltage, for altering said current flow in said high voltage generator and reducing said generated signals thereby limiting said high voltage.

2. A high voltage protection circuit according to claim 1 wherein:

said deflection current occurs in cycles, each cycle comprising a trace interval portion and a retrace interval portion; and said bidirectionally conductive switching means comprises an integrated thyristor-rectifier, the rectifier portion of which is coupled for conduction of said deflection current during a first portion of said trace interval of each deflection current cycle.

3. A high voltage protection circuit for rendering a display on a kinescope unviewable when the voltage supplied thereto becomes excessive, comprising:

a deflection winding arranged about said kinescope for producing a viewable display thereon in response to deflection current in said deflection winding; and deflection current generating means coupled to said deflection winding for generating said defelction current therein, said deflection current generating means, including bidirectionally conductive switching means conducting current in a first direction for supplying scanning current to said deflection winding and conducting in an opposite direction when voltage variations of greater than a predetermined amplitude across said switching means are in such direction as to promote current flow in said opposite direction, said conduction in said opposite direction substantially altering said flow of deflection current in said deflection winding thereby rendering said display unviewable.

4. A high voltage protection circuit according to claim 3 wherein said bidirectional conductive switching means is an integrated thyristor rectifier having its rectifier portion coupled for conduction of said scanning current.

5. A high voltage protection circuit for rendering a display on a kinescope unviewable when said voltage exceeds a predetermined level, comprising:

a deflection winding disposed about said kinescope for generating a viewable display thereon in response to the flow of deflection current in said deflection winding;

a deflection system coupled to said deflection winding for generating said deflection current therein; and deflection current damper means coupled to said deflection system and to said deflection winding and having first and second terminals and first and second conductive states, said first state for allowing current flow from said first to said second terminal when the voltage at said first terminal is positive with respect to the voltage at said second terminal and said second state for allowing current flow from said second to said first terminal, said second state being inititated by voltage at said second terminal which exceeds a predetermined value with respect to said voltage at said first terminal, said current flow from said first to said second terminal providing scanning current to said deflection winding and said current flow from said second terminal to said first terminal for disrupting said current flow in said deflection winding for rendering said display unviewable when said voltage at said second terminal exceeds said predetermined voltage.

6. A high voltage protection circuit according to claim 5 wherein said deflection current damper means is an integrated thyristor-rectifier having its rectifier portion coupled for conduction from said first to said second terminal when said voltage at said first terminal is positive with respect to said voltage at said second terminal.

* * * * *